US008594138B2

(12) United States Patent
Hirano

(10) Patent No.: US 8,594,138 B2
(45) Date of Patent: *Nov. 26, 2013

(54) METHODS FOR IN-BAND SIGNALING THROUGH ENHANCED VARIABLE-RATE CODECS

(75) Inventor: Michael Hirano, Redmond, WA (US)

(73) Assignee: Airbiquity Inc., Seattle, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/184,752

(22) Filed: Jul. 18, 2011

(65) Prior Publication Data

US 2011/0287736 A1 Nov. 24, 2011

Related U.S. Application Data

(63) Continuation-in-part of application No. 12/252,284, filed on Oct. 15, 2008, now Pat. No. 7,983,310.

(60) Provisional application No. 61/097,177, filed on Sep. 15, 2008, provisional application No. 61/101,880, filed on Oct. 1, 2008.

(51) Int. Cl.
*H04J 3/12* (2006.01)

(52) U.S. Cl.
USPC ........... 370/525; 370/320; 370/335; 370/342; 370/441; 370/479; 370/493; 370/494; 455/702; 455/703; 375/134; 375/137; 375/272; 375/275; 375/303; 375/307; 375/334; 375/335

(58) Field of Classification Search
USPC ......... 370/320, 335, 342, 441, 479, 493, 494, 370/525, 526; 455/702, 703; 375/134, 137, 375/272–278, 303–307, 334–337
See application file for complete search history.

(56) References Cited

U.S. PATENT DOCUMENTS

| | | | |
|---|---|---|---|
| 3,742,197 | A | 6/1973 | Pommerening |
| 3,742,463 | A | 6/1973 | Haselwood |
| 3,971,888 | A | 7/1976 | Ching |
| 3,984,814 | A | 10/1976 | Bailey, Jr. |
| 3,985,965 | A | 10/1976 | Field |
| 4,158,748 | A | 6/1979 | En |

(Continued)

FOREIGN PATENT DOCUMENTS

| | | |
|---|---|---|
| CA | 2242495 | 1/2000 |
| DE | 44 24 412 A1 | 1/1996 |

(Continued)

OTHER PUBLICATIONS

Hissen, DTMF Tones, Aug. 7, 2007, DialABC, http://web.archive.org/web/20070807103635/http://www.dialabc.com/sound/dtmf.html.*

(Continued)

*Primary Examiner* — Hoon J Chung
(74) *Attorney, Agent, or Firm* — Stolowitz Ford Cowger LLP

(57) ABSTRACT

Improvements are disclosed for in-band signaling, i.e., transmission of data in a voice channel of a digital wireless network during a voice call session. A family of narrow-band signaling methods, some employing tapered waveforms, is disclosed to successfully pass data-carrying signals through the low-bit rate modes of the EVRC-B vocoder commonly used in CDMA wireless channels. These features can be used in cell phones or other wireless communication devices, including automotive applications.

12 Claims, 4 Drawing Sheets

(56) References Cited

U.S. PATENT DOCUMENTS

| | | | |
|---|---|---|---|
| 4,218,654 A | 8/1980 | Ogawa et al. | |
| 4,310,722 A | 1/1982 | Schaible | |
| 4,355,310 A | 10/1982 | Belaigues | |
| 4,368,987 A | 1/1983 | Waters | |
| 4,494,114 A | 1/1985 | Kaish | |
| 4,494,211 A | 1/1985 | Schwartz | |
| 4,539,557 A | 9/1985 | Redshaw | |
| 4,577,343 A | 3/1986 | Oura | |
| 4,595,950 A | 6/1986 | Lofberg | |
| 4,598,272 A | 7/1986 | Cox | |
| 4,599,583 A | 7/1986 | Shimozono et al. | |
| 4,607,257 A | 8/1986 | Noguchi | |
| 4,630,301 A | 12/1986 | Hohl | |
| 4,641,323 A | 2/1987 | Tsang | |
| 4,651,157 A | 3/1987 | Gray | |
| 4,656,463 A | 4/1987 | Anders et al. | |
| 4,675,656 A | 6/1987 | Narcisse | |
| 4,685,131 A | 8/1987 | Horne | |
| 4,750,197 A | 6/1988 | Denekamp et al. | |
| 4,754,255 A | 6/1988 | Sanders | |
| 4,766,589 A | 8/1988 | Fisher | |
| 4,776,003 A | 10/1988 | Harris | |
| 4,817,089 A | 3/1989 | Paneth | |
| 4,831,647 A | 5/1989 | D'Avello | |
| 4,860,336 A | 8/1989 | D'Avello | |
| 4,914,651 A | 4/1990 | Lusignan | |
| 4,918,425 A | 4/1990 | Greenberg et al. | |
| 4,918,717 A | 4/1990 | Bissonnette et al. | |
| 4,926,444 A | 5/1990 | Hamilton et al. | |
| 4,941,155 A | 7/1990 | Chuang | |
| 4,965,821 A | 10/1990 | Bishop | |
| 4,977,609 A | 12/1990 | McClure | |
| 4,984,238 A | 1/1991 | Watanabe | |
| 5,014,344 A | 5/1991 | Goldberg | |
| 5,025,455 A | 6/1991 | Nguyen | |
| 5,036,537 A | 7/1991 | Jeffers | |
| 5,040,214 A | 8/1991 | Grossberg | |
| 5,043,736 A | 8/1991 | Darnell et al. | |
| 5,081,667 A | 1/1992 | Drori | |
| 5,095,307 A | 3/1992 | Shimura | |
| 5,119,403 A | 6/1992 | Krishnan | |
| 5,119,504 A | 6/1992 | Durboraw, III | |
| 5,134,644 A | 7/1992 | Garton et al. | |
| 5,155,689 A | 10/1992 | Wortham | |
| 5,191,611 A | 3/1993 | Lang | |
| 5,201,071 A | 4/1993 | Webb | |
| 5,203,012 A | 4/1993 | Patsiokas | |
| 5,208,446 A | 5/1993 | Martinez | |
| 5,212,831 A | 5/1993 | Chuang | |
| 5,214,556 A | 5/1993 | Kilbel | |
| 5,218,618 A | 6/1993 | Sagey | |
| 5,223,844 A | 6/1993 | Mansell et al. | |
| 5,227,776 A | 7/1993 | Starefoss | |
| 5,235,633 A | 8/1993 | Dennison et al. | |
| 5,245,634 A | 9/1993 | Averbuch | |
| 5,245,647 A | 9/1993 | Grouffal | |
| 5,272,747 A | 12/1993 | Meads | |
| 5,282,204 A | 1/1994 | Shpancer | |
| 5,289,372 A | 2/1994 | Guthrie et al. | |
| 5,301,353 A | 4/1994 | Borras et al. | |
| 5,301,359 A | 4/1994 | Van den Heuvel | |
| 5,305,384 A | 4/1994 | Ashby et al. | |
| 5,317,309 A | 5/1994 | Vercellotti et al. | |
| 5,331,635 A | 7/1994 | Ota | |
| 5,333,175 A | 7/1994 | Ariyavisitakul | |
| 5,334,974 A | 8/1994 | Simms | |
| 5,347,272 A | 9/1994 | Ota | |
| 5,363,375 A | 11/1994 | Chuang | |
| 5,363,376 A | 11/1994 | Chuang | |
| 5,365,450 A | 11/1994 | Schuchman et al. | |
| 5,365,577 A | 11/1994 | Davis | |
| 5,379,224 A | 1/1995 | Brown et al. | |
| 5,381,129 A | 1/1995 | Boardman | |
| 5,388,147 A | 2/1995 | Grimes | |
| 5,388,247 A | 2/1995 | Goodwin et al. | |
| 5,389,934 A | 2/1995 | Kass | |
| 5,390,216 A | 2/1995 | Bilitza | |
| 5,396,539 A | 3/1995 | Slekys et al. | |
| 5,396,653 A | 3/1995 | Kivari | |
| 5,408,684 A | 4/1995 | Yunoki | |
| 5,410,541 A | 4/1995 | Hotto | |
| 5,410,739 A | 4/1995 | Hart | |
| 5,414,432 A | 5/1995 | Penny et al. | |
| 5,418,537 A | 5/1995 | Bird | |
| 5,420,592 A | 5/1995 | Johnson | |
| 5,422,816 A | 6/1995 | Sprague et al. | |
| 5,428,636 A | 6/1995 | Meier | |
| 5,438,337 A | 8/1995 | Aguado | |
| 5,440,491 A | 8/1995 | Kawano et al. | |
| 5,448,622 A | 9/1995 | Huttunen | |
| 5,450,130 A | 9/1995 | Foley | |
| 5,458,469 A | 10/1995 | Hauser | |
| 5,461,390 A | 10/1995 | Hoshen | |
| 5,475,864 A | 12/1995 | Hamabe | |
| 5,475,868 A | 12/1995 | Duque-Anton | |
| 5,479,480 A | 12/1995 | Scott | |
| 5,479,482 A | 12/1995 | Grimes | |
| 5,483,549 A | 1/1996 | Weinberg et al. | |
| 5,491,690 A | 2/1996 | Alfonsi | |
| 5,497,149 A | 3/1996 | Fast | |
| 5,504,491 A | 4/1996 | Chapman | |
| 5,504,833 A * | 4/1996 | George et al. | 704/211 |
| 5,506,888 A | 4/1996 | Hayes | |
| 5,509,035 A | 4/1996 | Teidemann, Jr. et al. | |
| 5,510,797 A | 4/1996 | Abraham et al. | |
| 5,513,111 A | 4/1996 | Wortham | |
| 5,515,043 A | 5/1996 | Berard | |
| 5,519,403 A | 5/1996 | Bickley et al. | |
| 5,519,621 A | 5/1996 | Wortham | |
| 5,528,232 A | 6/1996 | Verma et al. | |
| 5,530,701 A | 6/1996 | Stillman | |
| 5,533,121 A | 7/1996 | Suzuki | |
| 5,537,458 A | 7/1996 | Suomi et al. | |
| 5,539,810 A | 7/1996 | Kennedy, III et al. | |
| 5,543,789 A | 8/1996 | Behr | |
| 5,544,222 A | 8/1996 | Robinson | |
| 5,544,225 A | 8/1996 | Kennedy, III et al. | |
| 5,546,445 A | 8/1996 | Dennison et al. | |
| 5,550,551 A | 8/1996 | Alesio | |
| 5,551,066 A | 8/1996 | Stillman | |
| 5,555,286 A | 9/1996 | Tendler | |
| 5,557,254 A | 9/1996 | Johnson | |
| 5,559,520 A | 9/1996 | Barzegar et al. | |
| 5,565,858 A | 10/1996 | Guthrie | |
| 5,566,173 A | 10/1996 | Steinbrecher | |
| 5,572,204 A | 11/1996 | Timm et al. | |
| 5,576,716 A | 11/1996 | Sadler | |
| 5,587,715 A | 12/1996 | Lewis | |
| 5,590,396 A | 12/1996 | Henry | |
| 5,594,425 A | 1/1997 | Ladner et al. | |
| RE35,498 E | 4/1997 | Barnard | |
| 5,619,684 A | 4/1997 | Goodwin | |
| 5,621,388 A | 4/1997 | Sherburne et al. | |
| 5,625,668 A | 4/1997 | Loomis et al. | |
| 5,627,517 A | 5/1997 | Theimer et al. | |
| 5,630,206 A | 5/1997 | Urban et al. | |
| 5,640,444 A | 6/1997 | O'Sullivan | |
| 5,650,770 A | 7/1997 | Schlager et al. | |
| 5,663,734 A | 9/1997 | Krasner | |
| 5,666,357 A | 9/1997 | Jangi | |
| 5,668,803 A | 9/1997 | Tymes | |
| 5,673,305 A | 9/1997 | Ross | |
| 5,680,439 A | 10/1997 | Aguilera et al. | |
| 5,686,910 A | 11/1997 | Timm et al. | |
| 5,687,215 A | 11/1997 | Timm et al. | |
| 5,687,216 A | 11/1997 | Svensson | |
| 5,691,980 A | 11/1997 | Welles, II et al. | |
| 5,703,598 A | 12/1997 | Emmons | |
| 5,711,013 A | 1/1998 | Collett et al. | |
| 5,712,619 A | 1/1998 | Simkin | |
| 5,712,899 A | 1/1998 | Pace | |
| 5,724,243 A | 3/1998 | Westerlage et al. | |
| 5,726,893 A | 3/1998 | Schuchman et al. | |
| 5,726,984 A | 3/1998 | Kubler et al. | |

(56) References Cited

U.S. PATENT DOCUMENTS

| | | | |
|---|---|---|---|
| 5,731,757 A | 3/1998 | Layson |
| 5,732,326 A | 3/1998 | Maruyama et al. |
| 5,734,981 A | 3/1998 | Kennedy, III et al. |
| 5,742,233 A | 4/1998 | Hoffman et al. |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski et al. |
| 5,752,193 A | 5/1998 | Scholefield |
| 5,752,195 A | 5/1998 | Tsuji |
| 5,754,554 A | 5/1998 | Nakahara |
| 5,754,589 A * | 5/1998 | Maitra et al. ............... 375/216 |
| D395,250 S | 6/1998 | Kabler et al. |
| 5,761,204 A | 6/1998 | Grob et al. |
| 5,761,292 A | 6/1998 | Wagner |
| 5,771,001 A | 6/1998 | Cobb |
| 5,771,455 A | 6/1998 | Kennedy, III et al. |
| 5,774,876 A | 6/1998 | Woolley et al. |
| 5,778,024 A | 7/1998 | McDonough |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott et al. |
| 5,797,091 A | 8/1998 | Clise |
| 5,804,810 A | 9/1998 | Woolley et al. |
| 5,805,576 A | 9/1998 | Worley, III |
| 5,812,087 A | 9/1998 | Krasner |
| 5,812,522 A | 9/1998 | Lee |
| 5,812,786 A * | 9/1998 | Seazholtz et al. ............ 709/233 |
| 5,815,114 A | 9/1998 | Speasl et al. |
| RE35,916 E | 10/1998 | Dennison et al. |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell et al. |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung et al. |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley et al. |
| 5,892,454 A | 4/1999 | Schipper et al. |
| 5,901,179 A | 5/1999 | Urabe et al. |
| 5,911,129 A | 6/1999 | Towell |
| 5,912,886 A | 6/1999 | Takahashi et al. |
| 5,913,170 A | 6/1999 | Wortham |
| 5,915,210 A | 6/1999 | Cameron |
| 5,917,449 A | 6/1999 | Sanderford et al. |
| 5,918,180 A | 6/1999 | Dimino |
| 5,930,340 A | 7/1999 | Bell |
| 5,930,722 A | 7/1999 | Han et al. |
| 5,933,468 A | 8/1999 | Kingdon |
| 5,936,526 A | 8/1999 | Klein |
| 5,937,355 A | 8/1999 | Joong et al. |
| 5,940,598 A | 8/1999 | Strauss et al. |
| 5,945,944 A | 8/1999 | Krasner |
| 5,946,304 A | 8/1999 | Chapman et al. |
| 5,946,611 A | 8/1999 | Dennison et al. |
| 5,949,335 A | 9/1999 | Maynard |
| 5,953,694 A | 9/1999 | Pillekamp |
| 5,960,363 A | 9/1999 | Mizikovsky et al. |
| 5,961,608 A | 10/1999 | Onosaka |
| 5,963,130 A | 10/1999 | Schlager et al. |
| 5,963,134 A | 10/1999 | Bowers et al. |
| 5,970,130 A | 10/1999 | Katko |
| 5,978,676 A | 11/1999 | Guridi et al. |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine et al. |
| 6,014,089 A | 1/2000 | Tracy et al. |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas et al. |
| 6,032,037 A | 2/2000 | Jeffers |
| 6,038,310 A | 3/2000 | Hollywood et al. |
| 6,038,595 A | 3/2000 | Ortony |
| 6,041,124 A | 3/2000 | Sugita |
| 6,044,257 A | 3/2000 | Boling et al. |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan et al. |
| 6,067,457 A | 5/2000 | Erickson et al. |
| 6,069,570 A | 5/2000 | Herring |
| 6,070,089 A | 5/2000 | Brophy et al. |
| 6,075,458 A | 6/2000 | Ladner et al. |
| 6,076,099 A | 6/2000 | Chen et al. |
| 6,081,523 A | 6/2000 | Merchant |
| 6,091,969 A | 7/2000 | Brophy et al. |
| 6,097,760 A | 8/2000 | Spicer |
| 6,101,395 A | 8/2000 | Keshavachar et al. |
| 6,121,922 A | 9/2000 | Mohan |
| 6,122,271 A | 9/2000 | McDonald |
| 6,122,514 A | 9/2000 | Spaur |
| 6,131,067 A | 10/2000 | Girerd et al. |
| 6,131,366 A | 10/2000 | Fukuda |
| 6,133,874 A | 10/2000 | Krasner |
| 6,140,956 A | 10/2000 | Hillman et al. |
| 6,144,336 A | 11/2000 | Preston et al. |
| 6,151,493 A | 11/2000 | Sasakura et al. |
| 6,154,658 A | 11/2000 | Caci |
| 6,166,688 A | 12/2000 | Cromer et al. |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach et al. |
| 6,195,736 B1 | 2/2001 | Lisle |
| 6,208,959 B1 | 3/2001 | Jonsson |
| 6,212,207 B1 | 4/2001 | Nicholas |
| 6,226,529 B1 | 5/2001 | Bruno et al. |
| 6,236,652 B1 | 5/2001 | Preston |
| 6,249,227 B1 | 6/2001 | Brady et al. |
| 6,266,008 B1 | 7/2001 | Huston et al. |
| 6,269,392 B1 | 7/2001 | Cotichini et al. |
| 6,272,315 B1 | 8/2001 | Chang et al. |
| 6,275,990 B1 | 8/2001 | Dapper et al. |
| 6,282,430 B1 | 8/2001 | Young |
| 6,288,645 B1 | 9/2001 | McCall et al. |
| 6,295,461 B1 | 9/2001 | Palmer et al. |
| 6,300,863 B1 | 10/2001 | Cotichini et al. |
| 6,300,875 B1 | 10/2001 | Schafer |
| 6,301,480 B1 | 10/2001 | Kennedy et al. |
| 6,304,186 B1 | 10/2001 | Rabanne et al. |
| 6,304,637 B1 | 10/2001 | Mirashrafi et al. |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |

(56) References Cited

U.S. PATENT DOCUMENTS

| | | |
|---|---|---|
| 6,351,495 B1 | 2/2002 | Tarraf |
| 6,358,145 B1 | 3/2002 | Wong |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III et al. |
| 6,430,162 B1 | 8/2002 | Reese |
| 6,430,176 B1 | 8/2002 | Christie, IV |
| 6,434,198 B1 | 8/2002 | Tarraf |
| 6,466,582 B2 | 10/2002 | Venters et al. |
| 6,470,046 B1 | 10/2002 | Scott |
| 6,477,633 B1 | 11/2002 | Grimmett |
| 6,493,338 B1 | 12/2002 | Preston et al. |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,545,988 B1 | 4/2003 | Skog |
| 6,611,804 B1 | 8/2003 | Dorbecker et al. |
| 6,614,349 B1 | 9/2003 | Proctor et al. |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston et al. |
| 6,683,855 B1 | 1/2004 | Bordogna |
| 6,690,681 B1 | 2/2004 | Preston et al. |
| 6,690,922 B1 | 2/2004 | Lindemann |
| 6,697,987 B2 | 2/2004 | Lee |
| 6,700,867 B2 | 3/2004 | Classon |
| 6,707,421 B1 | 3/2004 | Drury |
| 6,747,571 B2 | 6/2004 | Fierro |
| 6,754,265 B1 | 6/2004 | Lindemann |
| 6,771,629 B1 | 8/2004 | Preston et al. |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tiburtius |
| 6,917,449 B2 | 7/2005 | Nakajima et al. |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston et al. |
| 7,164,662 B2 | 1/2007 | Preston et al. |
| 7,206,305 B2 | 4/2007 | Preston et al. |
| 7,206,574 B2 | 4/2007 | Bright |
| 7,215,965 B2 | 5/2007 | Fournier et al. |
| 7,221,669 B2 | 5/2007 | Preston et al. |
| 7,269,188 B2 | 9/2007 | Smith |
| 7,286,522 B2 | 10/2007 | Preston |
| 7,317,696 B2 | 1/2008 | Preston |
| 7,398,100 B2 | 7/2008 | Harris |
| 7,430,428 B2 | 9/2008 | Van Bosch |
| 7,477,906 B2 | 1/2009 | Radic |
| 7,483,418 B2 | 1/2009 | Maurer |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 | 9/2009 | Holmes |
| 7,586,240 B2 | 9/2009 | Tsuda |
| 7,593,449 B2 | 9/2009 | Shattil |
| 7,606,555 B2 | 10/2009 | Walsh |
| 7,688,260 B2 | 3/2010 | Pomerantz |
| 7,733,853 B2 | 6/2010 | Moinzadeh |
| 7,747,281 B2 | 6/2010 | Preston |
| 7,809,367 B2 | 10/2010 | Hellaker |
| 7,848,358 B2 * | 12/2010 | LaDue .................. 370/494 |
| 7,848,763 B2 | 12/2010 | Fournier |
| 7,856,240 B2 | 12/2010 | Gunn |
| 7,924,934 B2 | 4/2011 | Birmingham |
| 7,979,095 B2 | 7/2011 | Birmingham |
| 7,983,310 B2 | 7/2011 | Hirano |
| 8,036,201 B2 | 10/2011 | Moinzadeh |
| 8,036,600 B2 | 10/2011 | Garrett |
| 8,068,792 B2 | 11/2011 | Preston |
| 8,194,526 B2 | 6/2012 | Madhavan |
| 2002/0022465 A1 | 2/2002 | McCullagh |
| 2002/0071432 A1 | 6/2002 | Soderberg |
| 2002/0093924 A1 | 7/2002 | Preston et al. |
| 2002/0093990 A1 | 7/2002 | Preston et al. |
| 2002/0097706 A1 | 7/2002 | Preston |
| 2002/0111167 A1 | 8/2002 | Nguyen |
| 2002/0122401 A1 | 9/2002 | Xiang |
| 2003/0016639 A1 | 1/2003 | Kransmo |
| 2003/0073406 A1 | 4/2003 | Benjamin |
| 2003/0147401 A1 | 8/2003 | Kyronaho |
| 2003/0206625 A9 | 11/2003 | Ahmad |
| 2003/0212562 A1 | 11/2003 | Patel |
| 2003/0227939 A1 | 12/2003 | Yukie |
| 2004/0034529 A1 | 2/2004 | Hooper, III |
| 2004/0171370 A1 | 9/2004 | Natarajan |
| 2004/0192345 A1 | 9/2004 | Osborn |
| 2004/0260542 A1 | 12/2004 | Ananthapadmanabhan et al. |
| 2005/0031097 A1 | 2/2005 | Rabenko |
| 2005/0033511 A1 | 2/2005 | Pechatnikov |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan |
| 2005/0215228 A1 | 9/2005 | Fostick |
| 2005/0226202 A1 | 10/2005 | Zhang |
| 2005/0278169 A1 | 12/2005 | Hardwick |
| 2006/0019713 A1 | 1/2006 | Rokusek |
| 2006/0059261 A1 | 3/2006 | Finkenzeller |
| 2006/0171368 A1 | 8/2006 | Moinzadeh |
| 2006/0246910 A1 | 11/2006 | Petermann |
| 2006/0287003 A1 | 12/2006 | Moinzadeh |
| 2007/0087756 A1 | 4/2007 | Hoffberg |
| 2007/0124625 A1 | 5/2007 | Hassan |
| 2007/0155360 A1 | 7/2007 | An |
| 2007/0162834 A1 | 7/2007 | Banerjee |
| 2007/0211624 A1 | 9/2007 | Schmidt |
| 2007/0258398 A1 | 11/2007 | Chesnutt |
| 2007/0264964 A1 | 11/2007 | Birmingham |
| 2008/0025295 A1 | 1/2008 | Elliott |
| 2008/0039017 A1 | 2/2008 | Kim |
| 2008/0056469 A1 | 3/2008 | Preston |
| 2008/0107094 A1 | 5/2008 | Borella |
| 2008/0132200 A1 | 6/2008 | Shinoda |
| 2008/0140394 A1 | 6/2008 | Holmes |
| 2008/0143497 A1 | 6/2008 | Wasson et al. |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0088180 A1 | 4/2009 | LaMance |
| 2009/0110033 A1 | 4/2009 | Shattil |
| 2009/0265173 A1 | 10/2009 | Madhavan et al. |
| 2009/0298428 A1 | 12/2009 | Shin |
| 2009/0304057 A1 | 12/2009 | Werner |
| 2009/0306976 A1 | 12/2009 | Joetten et al. |
| 2010/0197322 A1 | 8/2010 | Preston |
| 2010/0211660 A1 | 8/2010 | Kiss |
| 2011/0211625 A1 | 9/2011 | Birmingham |
| 2011/0287736 A1 | 11/2011 | Hirano |
| 2011/0312322 A1 | 12/2011 | Garrett |
| 2012/0040651 A1 | 2/2012 | Quimby |

FOREIGN PATENT DOCUMENTS

| | | |
|---|---|---|
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 512 789 A2 | 11/1992 |
| EP | 0 545 753 A1 | 6/1993 |
| EP | 0 545 783 A1 | 6/1993 |
| EP | 0 580 397 A2 | 1/1994 |

(56) References Cited

FOREIGN PATENT DOCUMENTS

| | | |
|---|---|---|
| EP | 0889610 A2 | 1/1999 |
| EP | 0 545 783 B1 | 2/1999 |
| EP | 0 896 442 A1 | 2/1999 |
| EP | 1 093 253 A2 | 4/2001 |
| EP | 1 329 693 A2 | 7/2003 |
| EP | 1 843 503 A2 | 10/2007 |
| GB | 2 290 005 A | 5/1994 |
| IN | 199 48 966 A1 | 4/2000 |
| JP | 03232349 | 10/1991 |
| JP | 5130008 | 5/1993 |
| JP | 05-207107 | 8/1993 |
| JP | 5252099 | 9/1993 |
| JP | 6077887 | 3/1994 |
| JP | 06188849 A1 | 7/1994 |
| JP | 8-293832 A | 11/1996 |
| JP | 09-259391 | 9/1997 |
| JP | 09261281 A1 | 10/1997 |
| JP | 10-215328 | 7/1998 |
| JP | 10-232138 | 8/1998 |
| JP | 11109062 | 4/1999 |
| JP | 11-312285 | 11/1999 |
| JP | 2000-068925 | 3/2000 |
| JP | P3044064 | 3/2000 |
| JP | 2001-211189 | 7/2001 |
| JP | 2001-238256 | 8/2001 |
| JP | 2002-181921 A | 6/2002 |
| JP | 2004264224 A | 9/2004 |
| JP | 2008507940 A | 3/2008 |
| TW | 2010/18163 A | 5/2010 |
| WO | WO 89/12835 | 12/1989 |
| WO | WO 9107044 | 5/1991 |
| WO | WO 95/21511 | 8/1995 |
| WO | WO 96/07110 | 3/1996 |
| WO | WO 96/15636 | 5/1996 |
| WO | WO 96/18275 | 6/1996 |
| WO | WO 9834164 | 8/1998 |
| WO | WO 9834359 | 8/1998 |
| WO | WO 98/53573 | 11/1998 |
| WO | WO 98/59256 | 12/1998 |
| WO | WO 98/59257 | 12/1998 |
| WO | WO 99/14885 A2 | 3/1999 |
| WO | WO 99/36795 | 7/1999 |
| WO | WO 99/49677 | 9/1999 |
| WO | WO 99/56143 | 11/1999 |
| WO | WO 99/56144 | 11/1999 |
| WO | 00/11893 A1 | 3/2000 |
| WO | WO 00/11893 | 3/2000 |
| WO | WO 0178249 A1 | 10/2001 |
| WO | WO 0199295 A2 | 12/2001 |
| WO | WO 03034235 A1 | 4/2003 |
| WO | WO 03/081373 A2 | 10/2003 |
| WO | 2004/095818 A1 | 4/2004 |
| WO | WO 2009/149356 A2 | 12/2009 |
| WO | 2013/043325 A1 | 3/2013 |

OTHER PUBLICATIONS

Siwy, Generation and Recognition of DTMF Signals with the Microcontroller MSP430, Oct. 1997, Texas Instruments, 59 pages.*
Supplemental European Search Report for Application 08840726.7 dated Sep. 19, 2012; 8 pages.
International Search Report for PCT/US12/52712 dated Nov. 2, 2012; 4 pages.
Translation of a portion of JP 09-259391 by Sugimura; provided Oct. 11, 2012; 5 pages.
Translation of a portion of JP 10-215328 by Sugimura; provided Oct. 11, 2012; 3 pages.
Translation of a portion of JP 10-232138 by Sugimura; provided Oct. 11, 2012; 2 pages.
Translation of a portion of JP 11-312285 by Sugimura; provided Oct. 11, 2012; 1 page.
Translation of a portion of JP 2001-211189 by Sugimura; provided Oct. 11, 2012; 1 page.

Stolowitz Ford Cowger LLP List of Related Cases dated Dec. 23, 2011.
Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.
Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.
Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.
PCT International Search Report dated Nov. 27, 2000 for International Application No. PCT/US00/13288.
PCT/US2009/056834 International Search Report and Written Opinion dated Dec. 30, 2009; 12 pages.
3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.
International Preliminary Report on Patentability in PCT/US2006/022985 dated Jan. 3, 2008; 6 pages.
3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.
Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).
International Search Report and Written Opinion of International Application No. PCT/US07/64443, dated Sep. 15, 2008.
International Search Report for PCT/US06/03416, dated Feb. 5, 2007, 3 pages.
Janus Technologies, Inc., "ProxTrak Asset Tracking Interface," copyright 2000 Janus Technologies, Inc., published on the Internet at http://www.janus-tech.com/Products/ProxTrax.html, printed May 29, 2002.
Protean Research Group, "Anycast Routing for Mobile Services (ARMS) Project Overview," Published on the Internet at <http://tang.itd.nrl.navy.mll/5522/anycast/anycast_index.html>.
U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.
Universal Mobile Telecommunications System (UMTS); Push Architecture (3GPP TR 23.976 version 6.1.0 Release 6); Jun. 2004; 36 pages.
USPTO Search Authority; PCT/US08/80555 International Search Report; Dec. 19, 2008, 11 pages.
Vaha-Sipila, A., URLs for Telephone Calls, Request for Comments: 2806, Network Working Group, Apr. 2000, 16 pages.
VOCAL Technologies, Ltd. Home Page, "Audio Codecs," http://www.vocal.com/data_sheets/audio_codecs.html?glad, accessed Jun. 12, 2005.
Written Opinion of the International Searching Authority for PCT/US06/03416, dated Feb. 5, 2007, 3 pages.
Alfonso Bilbao, m-Security (Security an dMobile Telephone), Proceedings of the IEEE 35th Ann. 2001, International Camahan Conf. on Security Technology, Oct. 16-19, 2001.
Brown, et al., "A Reconfigurable Modem for Increased Network . . . " IEEE Trans. on Circuits & Systems for Video Technology, vol. 6, No. 2, Apr. 1996, pp. 215-224.
Thomas W. Christ, "A Prison Guard Duress Alarm Location System," Proceedings of the IEEE 1993 Int'l Carnahan Conf. on Security Tech., Oct. 13-15, 1993, Copyright 1993 IEEE.
Coleman et al., Subjective Performance Evaluation of the RPE-LTP Codec for the Pan-European Cellular Digital Radio Sys. Nov. 27-30, 1989, pp. 758-761; 1075-1079, IEEE.
Office Action for U.S. Appl. No. 09/677,486, filed Oct. 2, 2000

(56) References Cited

OTHER PUBLICATIONS

Feher, "MODEMS for Emerging Digital Cellular-Mobile Radio System," IEEE Trans. on Vehicular Technology, vol. 40, No. 2, May 1991, pp. 355-365.

Jani, et al., Potential Networking Applications of global Positioning Systems (GPS), downloadable at http://www.cis.ohio-state.edu/~jain/papers/gps.htm, pp. 1-40, Apr. 1996.

Janus Technologies, Inc., "ProxTrak Asset Tracking Interface," copyright 2000 Janus Tech., Inc. published at http://www.janus-tech.com/products/ProxTrax.html, printed May 2002.

Re Lavigne & P. Eng, "Trunking Versus Conventional Radio System," Proceedings of the IEEE, 34th Annual 2000 Int'l Carnahan Conf. Oct. 23-25, 2000.

Lin et al., "Data Compression of Voiceband Modem Signals," 40th IEEE Vehicular Tech. Conf.: On the Move in the 90s. May 6-9, 1990, pp. 323-325, IEEE New York, NY.

Lockwood Tech. Corp., "Asset Management," Copyright 2002 by Lockwood Tech. Corp. published at http://www.lockwoodtechnology.com/asset_tracking.html, May 29, 2002.

Brian W. Martin, "Watchlt: A Fully Sipervised Identification, Location and Tracking Sys." IEEE, 29th Annual 1995 Int'l Carnahan Conf. on Security Tech. Oct. 1995.

Shawn McNichols, "Keeping Your Assets Safe," published at http://www.securitymagazine.com/CDA/ArticleInformation/features/BNP_Features, posted Feb. 14, 2002.

Mueller et al., "A DSP Implemented Dual 9600/7200 BPS TCM Modem for Mobile Communications Over FM Voice Radio," 1997 IEEE Pac Rim Conf., vol. 2, Aug 20-22, 1997, p. 758-761.

Lisa A. Phifer, Surfing the Web Over Wireless, Jan. 1998, http://www.coreome.com/html/wireless.html, printed May 22, 2007.

Anton B. Reut, "Remote Monitoring of Military Assets Using Commercial Leo Satellites," IEEE universal Communications Conf. Record, Nov. 6-8, 1995, Copyright 1995 IEEE.

Jay Werb & Colin Lanzl, "Designing a Positioning System for Finding Things and People Indoors," IEEE Spectrum, Sep. 1998.

Jay Werb & Colin Lanzl, "The Next Generation of Control: Local Positioning," Abstract, Feb. 1999, vol. 26.

"Tracking," published at http://www.wisetrack.com/tacking/html, posted May 29, 2002, Copyright 2001 by TVL, Inc.

Office Action for U.S. Appl. No. 09/625,159, mailed Apr. 9, 2003, 15 pages.

European Search Report dated Dec. 22, 2004 for EP01950402, 5 pages.

International Search Report, PCT/US00/01157, May 23, 2000, 5 pages.

International Search Report, PCT/US01/19845, Nov. 22, 2001, 5 pages.

PCT International Search Report dated Jan. 3, 2002 for International Application No. PCT/US01/20021.

International Search Report, PCT/US01/27238, Feb. 13, 2002, 3 pages.

PCT/US02/00330, Jul. 11, 2002, Airbiquity, Inc.

PCT International Search Report dated Jun. 24, 2002, for International Application No. PCT/US02/00996.

International Search Report PCT/US00/01157; dated May 23, 2000; Applicant: Integrated Data Communications Inc.

International Search Report PCT/US01/27238; dated Aug. 30, 2001; Applicant: Airbiquity, Inc.

* cited by examiner

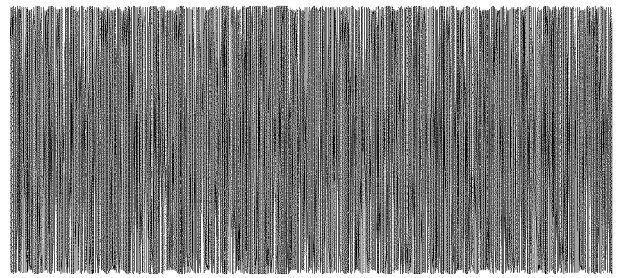
Figure 3  Rectangular windowed FSK Waveform Burst
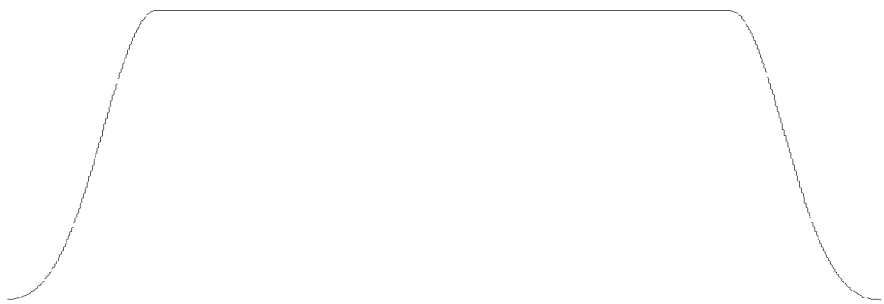
Figure 4  Window applied to FSK Waveform burst
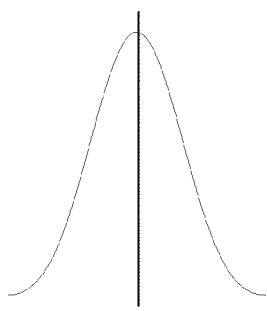
Figure 5 Blackman Window with line indicating midpoint

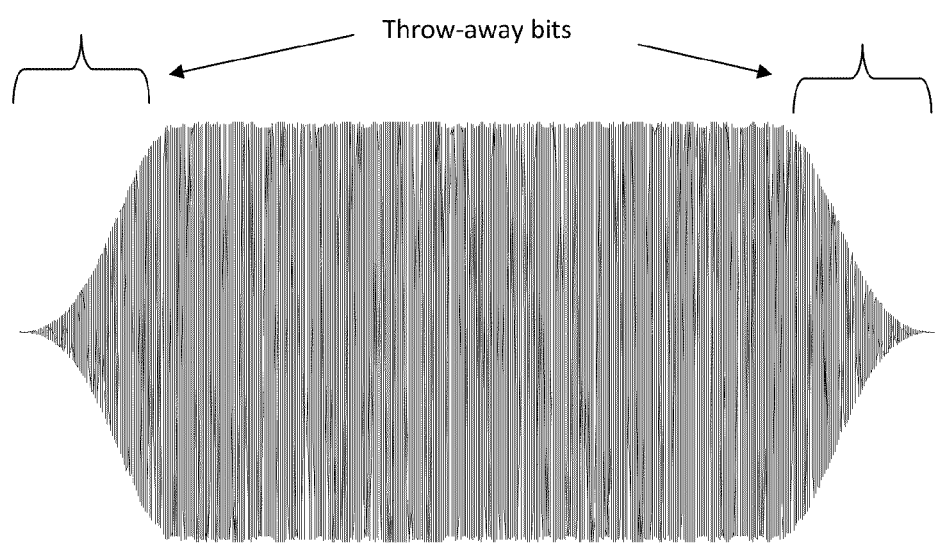
Figure 6 Windowed FSK Waveform Burst

METHODS FOR IN-BAND SIGNALING THROUGH ENHANCED VARIABLE-RATE CODECS

RELATED APPLICATIONS

This application is a continuation-in-part of U.S. patent application Ser. No. 12/252,284 entitled "Methods for In-Band Signaling through Enhanced Variable-Rate Codecs" filed on Oct. 15, 2008, which claims priority to U.S. Provisional Patent Application No. 61/097,177 entitled "Signal Design for Low-Bit Rate EVRC-B" filed on Sep. 15, 2008, as well as to U.S. Provisional Patent Application No. 61/101,880 entitled "Tapered Narrow-band Data Signaling Method, System and Software for Enhanced Variable-rate Codec Compatibility in In-Band Signaling" filed on Oct. 1, 2008, the disclosures of which are incorporated herein by reference in their entirety.

COPYRIGHT NOTICE

© 2008-2011 AIRBIQUITY INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

Wireless communications, including methods for in-band signaling of small amounts of data through a voice channel session of a digital wireless telecommunications system.

BACKGROUND

Many telecommunication components used in cellular and landline telephone networks are designed to efficiently transmit human voice signals over voice communication channels. For example, a digital voice coder (vocoder) uses linear predictive coding techniques to represent sampled voice signals in compressed form. These linear predictive coders filter out noise (non-voice signals) while compressing and estimating the frequency components of the voice signals before being transmitted over the voice channel.

It is sometimes desirable to transmit both audio signals and digital data over a wireless telecommunications network. For example, when a cellular telephone user calls "911" for emergency assistance, the user may wish to send digital location data to a call center over the same channel used to verbally explain the emergency conditions to a human operator. However, it can be difficult to transmit digital data signals over the voice channel of a wireless network because such signals are subject to several types of distortion. For example, encoded data signals traveling over the voice channel of a wireless network can be distorted by vocoder effects caused by the voice compression algorithm.

The need remains for improvements in data communications via the voice channel of a digital wireless telecommunications network. Voice channels are preferred for some applications, especially emergency applications, because wireless voice services, as distinguished from data services, are highly reliable, minimize delay, and are widely available in many geographic areas around the world.

Related information can be found in U.S. Pat. No. 6,144,336 incorporated herein by this reference. Additional disclosure can be found in U.S. Pat. No. 6,690,681 also incorporated by reference. And finally, further relevant disclosure appears in U.S. Pat. No. 6,493,338 also incorporated by reference as though fully set forth. The foregoing patents are owned by the assignee of the present application.

BRIEF DESCRIPTION OF THE DRAWINGS

FIG. 3 is an example of a rectangular windowed FSK waveform burst.

FIG. 4 illustrates an example of a window applied to the FSK waveform burst of FIG. 3.

FIG. 5 illustrates a Blackman Window with a vertical line indicating midpoint.

FIG. 6 illustrates a windowed FSK waveform burst.

DETAILED DESCRIPTION OF PREFERRED EMBODIMENTS

A family of narrow-band signaling methods is disclosed to successfully pass data-carrying signals through the low-bit rate modes of the EVRC-B vocoder commonly used in CDMA wireless channels. Narrow-band signals, or tones, above 2 kHz experience significant distortion by this processing chain, which results in poor detection performance in data transfer over the voice channel (called "in-band signaling") of the digital wireless network.

In one example consistent with the present invention, a narrow-band signal can be created to pass through known cellular network and EVRC-B processing and be successfully detected by a tone detector. Assuming that we have a system designed to detect a signal of given or predetermined frequency, we create the desired signal with an envelope that is tapered at both ends (see FIG. 1). We have discovered that this has the effect of stimulating the vocoder to represent the signal at higher bit rates that would otherwise occur. Consequently, the signal will be a more accurate representation of the original signal and be more readily detected by the receiver. By way of example, a preferred embodiment is described below.

Figure 1:
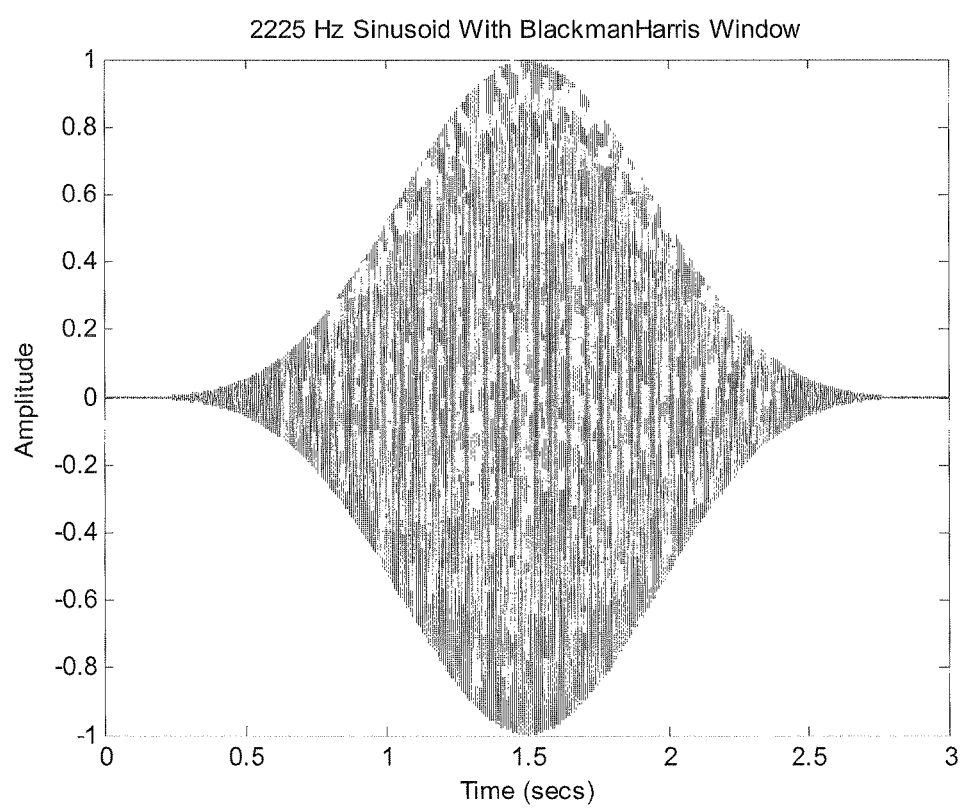
FIG. 1 is a plot of a 2225 Hz sinusoid with a Blackman-Harris window for transmission of data in a voice channel of a digital wireless telecommunications system.

In this example, the signal of interest is a 3 second 2225 Hz tone, and is created as a simple sinusoid multiplied by a windowing function as shown in FIG. 1. In this example, the Blackman-Harris window function is used, although there are other well-known windowing functions that could be used; e.g., Hamming, Parzen, Gaussian, Bartlett, Kaiser, etc. In addition to minimizing distortion by the EVRC-B network, another advantage of this waveform is that legacy detectors designed to detect the 2225 Hz tone will detect this new waveform as well. Thus this improved waveform can be used to advantage to signal a receiving modem, for example to prepare it to receive subsequent data to follow in the voice channel. The waveforms disclosed herein can also be used to prepare the transmission side coder or vocoder in advance of sending data encoded as audio frequency tones.

Once the design parameters of this waveform, such as its duration, frequency, and windowing function, are determined the waveform can be generated using a general programming language such as C, or with a signal processing software package such as Matlab. Both are commercially available. The digital samples of the waveform can then be stored in memory of the in-band signaling device, and retrieved whenever necessary for operation. Alternatively, the design parameters can be stored in memory of the in-band signaling device and the waveform generated 'on-the-fly' using these parameters whenever necessary.

These methods may be applied to various in-band signaling devices. For example, an in-band "modem" may be implemented in software stored and executed in a cell phone. It may execute using the cell phone processor and or DSP device. Other implementations of an in-band modem may be fashioned, for example, in a motor vehicle. In such cases, the modem may be coupled to an on-board network of the motor vehicle for integration with other systems. For example, an air bag deployment or other emergency signal (fire, engine explosion, etc) detected in the vehicle systems may be used to trigger the modem to initiate a call automatically to an emergency call taker.

The signaling concepts disclosed herein also may be used for the transmission of data. In some embodiments, the application of a windowing function or tapering to a data burst (e.g., an FSK data burst), may be advantageous for avoiding or minimizing distortion in a vocoder. Preferably, precautions should be taken to avoid bit errors at the leading and trailing edges of the burst which may arise due to the decreasing signal amplitude.

In a preferred embodiment, sacrificial or "throwaway" bits may be used during the tapered portion of the waveform, namely the leading and or trailing edges. The number of throwaway bits is the product of taper duration, bits per symbol, and the symbol rate of a particular implementation. For example, an implementation with a 0.010 second taper duration, 1 bit per symbol, and 400 symbols per second symbol rate has 4 throwaway bits in each tapered edge. To avoid bit errors, actual user data should not be placed in the tapered part of the waveform. FIG. 3 is an example of a rectangular windowed FSK waveform data burst. Here, payload bits are FSK-modulated. This arrangement may be subject to data loss or errors, however, for the reasons explained above related to vocoder due to speech compression algorithms or filtering.

FIG. 4 illustrates an example of an outline or envelope waveform comprising a window applied to the FSK waveform burst of FIG. 3. This window comprises tapered leading and trailing edges adjoined by a constant amplitude section. To form such a waveform, in one example, a Blackman Window, such as that illustrated in FIG. 5, may be used. The Blackman window can be split substantially at its midpoint, indicated by a vertical line in the drawing, and the edge portions interconnected by the constant amplitude data section.

Referring now to FIG. 6, the modified window is applied to the FSK waveform burst. The burst has throwaway bits appended at the leading and trailing edges with the window of FIG. 4 applied to the resulting waveform. In some embodiments, it may suffice to taper only the leading edge of the burst. In some embodiments, the waveforms may be generated under software control, i.e., as a computer or processor implemented process. General purpose microprocessors, special processors, DSP and the like may be used in various implementations, the details of which will be accessible to those skilled in the art in view of the present disclosure. In some embodiments, the tapered data burst concept may be realized in an in-band signaling modem for improved data communications via the voice channel of a digital wireless telecommunications network.

Digital Processor and Associated Memory

The invention in some embodiments may be implemented, as noted, by a digital computing system. By the term digital computing system we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor), vocoder, processor array, network processor, etc. A digital processor may be part of a larger device such as a laptop or desktop computer, a PDA, cell phone, iPhone PDA, Blackberry® PDA/phone, or indeed virtually any electronic device.

The associated memory, further explained below, may be integrated together with the processor, for example RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a suitable digital processor as is well known.

Storage of Computer Programs

As explained above, the present invention preferably is implemented or embodied in computer software (also known as a "computer program" or "code"; we use these terms interchangeably). Programs, or code, are most useful when stored in a digital memory that can be read by a digital processor.[1] We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

[1] In some cases, for example a simple text document or "flat file," a digital computing system may be able to "read" the file only in the sense of moving it, copying it, deleting it, emailing it, scanning it for viruses, etc. In other words, the file may not be executable on that particular computing system (although it may be executable on a different processor or computing system or platform.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

The present invention thus includes in-band signaling circuits and software configured to generate and or transmit waveforms of the types described herein. conversely, at the receiving end, detectors and decoders may be employed for decoding data transmitted using such waveforms. In some embodiments, the waveforms are backward compatible for detection and decoding by legacy equipment.

In some embodiments, a waveform of the type disclosed above may be used in combination with another tone or waveform to provide in-band modem signaling capability for wireless networks that employ multiple types of vocoders. An in-band modem may use a particular signaling waveform that operates in one type of vocoder channel, but not in another. Such a scenario arises when voice vocoders in the network are upgraded, as when EVRC-B vocoders are introduced to CDMA wireless networks and co-exist with legacy EVRC vocoders. Unlike EVRC, the EVRC-B voice codec channel is not transparent to signals over 2 kHz, and will suppress signals greater than 2 kHz that were developed for EVRC channels. In-band modems can use an EVRC compatible waveform in tandem with one that is compatible with EVRC-B to ensure operation in such a wireless network. Alternatively the combination may consist of one waveform that is detectable in both vocoder channels, and one that is compatible in only one vocoder channel.

Figure 2:
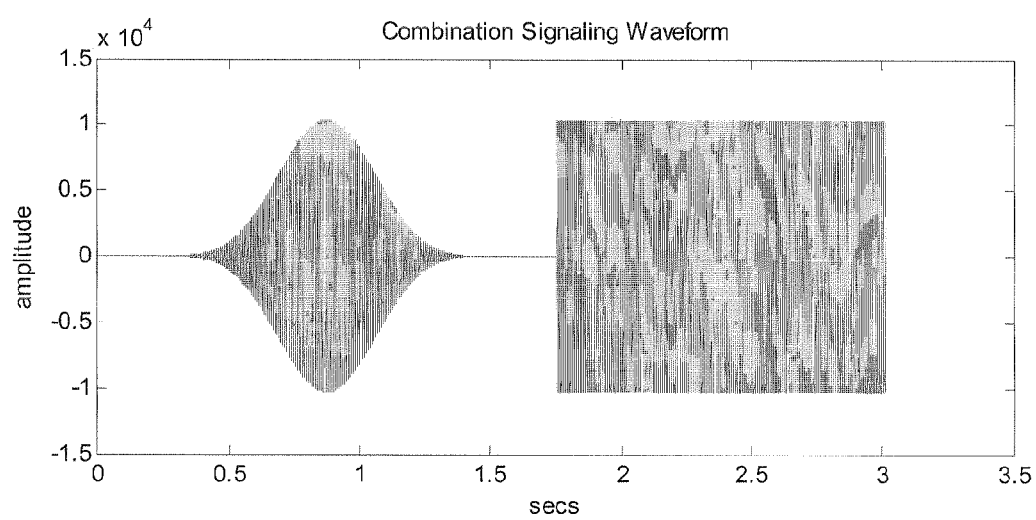
FIG. 2 is a plot illustrating an example of a combination signaling waveform for transmission of data in a voice channel of a digital wireless telecommunications system.

Another preferred embodiment employs the aforementioned tapered signaling waveform in tandem with another waveform using FSK-modulation. The tapered, or windowed, waveform is detectable in both EVRC and EVRC-B channels and the FSK-modulated signal is intended for use in the EVRC-B channel. Such a waveform combination results in improved performance in the EVRC-B channel because there are 2 waveforms that can be detected, and supports in-band modems that operate in EVRC channels. An example of this tandem waveform is shown in FIG. 2, in which a 2225 Hz windowed tone is followed by an FSK-modulated waveform.

It will be apparent to those having skill in the art that many changes may be made to the details of the above-described embodiments without departing from the underlying principles of the invention. The scope of the present invention should, therefore, be determined only by the following claims.

The invention claimed is:

1. A method for transmitting digital data in a voice channel connection of a digital wireless telecommunication system, the method comprising:
    receiving digital input data;
    encoding the digital input data into a series of audio frequency tones;
    assembling the series of audio frequency tones into a data burst;
    applying a selected windowing function to the data burst, the windowing function comprising a tapered leading edge followed by a substantially constant amplitude data region, so as to form a windowed waveform burst having the substantially constant amplitude data region that includes the data burst; and
    inputting the windowed waveform burst to a transmission side vocoder for transmission over the voice channel connection of the digital wireless telecommunication system;
    wherein the tapered leading edge of the windowing function gradually increases in amplitude from substantially zero amplitude to substantially a predetermined peak amplitude, over a first predetermined duration in a range of approximately one-half second to three seconds, so that the leading edge of the windowed waveform burst gradually increases in amplitude from substantially zero amplitude to substantially the predetermined peak amplitude, over the first predetermined duration.

2. The method of claim 1 wherein the selected windowing function also includes a tapered trailing edge, so that the windowed waveform burst includes tapered leading and trailing edges.

3. The method of claim 2 wherein each of the leading and trailing edges of the windowed waveform burst has a corresponding duration in a range of approximately one-half second to three seconds.

4. The method of claim 3 wherein the digital input data is encoded using FSK (frequency shift keying) modulation of two audio frequencies to form the data burst.

5. The method of claim 3 including inserting throw away bits into the tapered leading and trailing edges of the windowed waveform burst.

6. The method of claim 5 wherein the respective durations of the leading and trailing edges of the windowed waveform burst are substantial equal.

7. The method of claim 5 wherein the windowing function is formed using a windowing function selected from the group consisting of the Hamming, Parzen, Gaussian, Bartlett, and Kaiser window functions.

8. The method of claim 5 wherein the transmission side vocoder implements an EVRC-B vocoder.

9. An in-band signaling modem for use in a digital wireless telecommunications device to send data over a voice channel of a digital wireless telecommunications network, the in-band signaling modem comprising:
    software stored in a memory in the digital wireless telecommunications device, the software executable in a processor in the digital wireless telecommunications device;
    the software configured to control the processor to
    receive digital input data;
    encode the digital input data into a series of audio frequency tones;
    assemble the series of audio frequency tones into a data burst;
    apply a selected windowing function to the data burst, the windowing function comprising a tapered leading edge followed by a substantially constant amplitude data region, so as to form a windowed waveform burst having the substantially constant amplitude data region that includes the data burst; and
    output the windowed waveform burst to a transmission side vocoder for transmission over the voice channel connection of a digital wireless telecommunication system;
    wherein the tapered leading edge of the windowing function gradually increases in amplitude from substantially zero amplitude to substantially a predetermined peak amplitude, over a first predetermined duration in a range of approximately one-half second to three seconds, so that the leading edge of the windowed waveform burst gradually increases in amplitude from substantially zero amplitude to substantially the predetermined peak amplitude, over the first predetermined duration.

10. The in-band signaling modem according to claim 9 wherein:

the selected windowing function also includes a tapered trailing edge, so that the windowed waveform burst includes tapered leading and trailing edges; and each of the leading and trailing edges of the windowed waveform burst has a corresponding duration in a range of approximately one-half second to three seconds.

11. The in-band signaling modem according to claim 10 wherein the digital wireless telecommunications device comprises a cell phone or smart phone.

12. The in-band signaling modem according to claim 10 wherein the digital wireless telecommunications device is integrated into a motor vehicle and arranged for automatic operation to send data responsive to an emergency over said voice channel of the digital wireless telecommunications network.

* * * * *